US012546692B2

(12) United States Patent
Cayzac et al.

(10) Patent No.: US 12,546,692 B2
(45) Date of Patent: Feb. 10, 2026

(54) METHOD FOR ANALYSING SEMI-FINISHED PRODUCTS COMPRISING A THERMOPLASTIC RESIN

(71) Applicant: ARKEMA FRANCE, Colombes (FR)

(72) Inventors: Henri-Alexandre Cayzac, Serquigny (FR); Jérôme Pascal, Serquigny (FR); Régis Cipriani, Serquigny (FR)

(73) Assignee: ARKEMA FRANCE, Puteaux (FR)

( * ) Notice: Subject to any disclaimer, the term of this patent is extended or adjusted under 35 U.S.C. 154(b) by 455 days.

(21) Appl. No.: 18/004,467

(22) PCT Filed: Jul. 9, 2021

(86) PCT No.: PCT/FR2021/051283
§ 371 (c)(1),
(2) Date: Jan. 6, 2023

(87) PCT Pub. No.: WO2022/008855
PCT Pub. Date: Jan. 13, 2022

(65) Prior Publication Data
US 2023/0349798 A1 Nov. 2, 2023

(30) Foreign Application Priority Data
Jul. 10, 2020 (FR) .................... 2007315

(51) Int. Cl.
*G01N 3/08* (2006.01)
*B29C 70/06* (2006.01)
(Continued)

(52) U.S. Cl.
CPC .............. *G01N 3/08* (2013.01); *B29C 70/06* (2013.01); *B29C 70/44* (2013.01); *B29C 70/54* (2013.01);
(Continued)

(58) Field of Classification Search
CPC ............. G01N 3/08; G01N 2203/0092; G01N 2291/0231; B29K 2101/12; B29C 70/44
See application file for complete search history.

(56) References Cited

U.S. PATENT DOCUMENTS

| 2010/0170637 A1 | 7/2010 | Iannone |
| 2011/0017386 A1* | 1/2011 | Bouvet .................. B29C 70/46 156/228 |

(Continued)

FOREIGN PATENT DOCUMENTS

| EP | 2090423 A1 | 8/2009 |
| EP | 3606984 A1 | 2/2020 |
| WO | 2019097148 A1 | 5/2019 |

OTHER PUBLICATIONS

International Search Report (PCT/ISA/210) with English translation and Written Opinion (PCT/ISA/237) mailed on Oct. 28, 2021, by the European Patent Office as the International Searching Authority for International Application No. PCT/FR2021/051283.

(Continued)

*Primary Examiner* — Stephanie E Bloss
*Assistant Examiner* — Diana Hancock
(74) *Attorney, Agent, or Firm* — Boone IP Law

(57) ABSTRACT

A method for analyzing semifinished products including reinforcing fibers having an essentially unidirectional orientation and a thermoplastic resin, including a first and a second test for measuring the thickness of a stack of semifinished products over time during the compression thereof and for determining the equivalent homogeneous viscosity of the stack; determining the total thickness reduction of the stack of semifinished products during the first test; determining the ratio of the equivalent homogeneous viscosity of the stack from the second test to the equivalent homogeneous viscosity of the stack from the first test; and determining the ratio of the thickness of the stack from the first (Continued)

test after a reference time starting from the moment of the onset of melting of the stack of semifinished products, to the thickness of the stack from the first test at the moment of the onset of melting of the stack of semifinished products.

17 Claims, 9 Drawing Sheets

(51) Int. Cl.
   *B29C 70/44* (2006.01)
   *B29C 70/54* (2006.01)
   *B29K 101/12* (2006.01)
   *B29K 307/04* (2006.01)
   *B29K 309/08* (2006.01)

(52) U.S. Cl.
   CPC ...... *B29K 2101/12* (2013.01); *B29K 2307/04* (2013.01); *B29K 2309/08* (2013.01); *G01N 2203/0092* (2013.01); *G01N 2203/0096* (2013.01); *G01N 2291/0231* (2013.01)

(56) References Cited

U.S. PATENT DOCUMENTS

| | | | |
|---|---|---|---|
| 2011/0097575 A1 | 4/2011 | Pratte et al. | |
| 2012/0107560 A1 | 5/2012 | Rogers et al. | |
| 2013/0164498 A1 | 6/2013 | Langone et al. | |
| 2014/0005331 A1 | 1/2014 | Johnson et al. | |
| 2014/0154472 A1 | 6/2014 | Eto et al. | |
| 2018/0186098 A1* | 7/2018 | Meyer | C09D 5/00 |
| 2021/0130557 A1 | 5/2021 | Brule et al. | |

OTHER PUBLICATIONS

Saffar Florence et al., "In-situ Monitoring of the Out-Of-Autoclave Consolidation of Carbon/Poly-Ether-Ketone-Ketone Prepreg Laminate", Frontiers In Materials, vol. 7, Jun. 25, 2020, 12 pages.

\* cited by examiner

[Fig. 1]
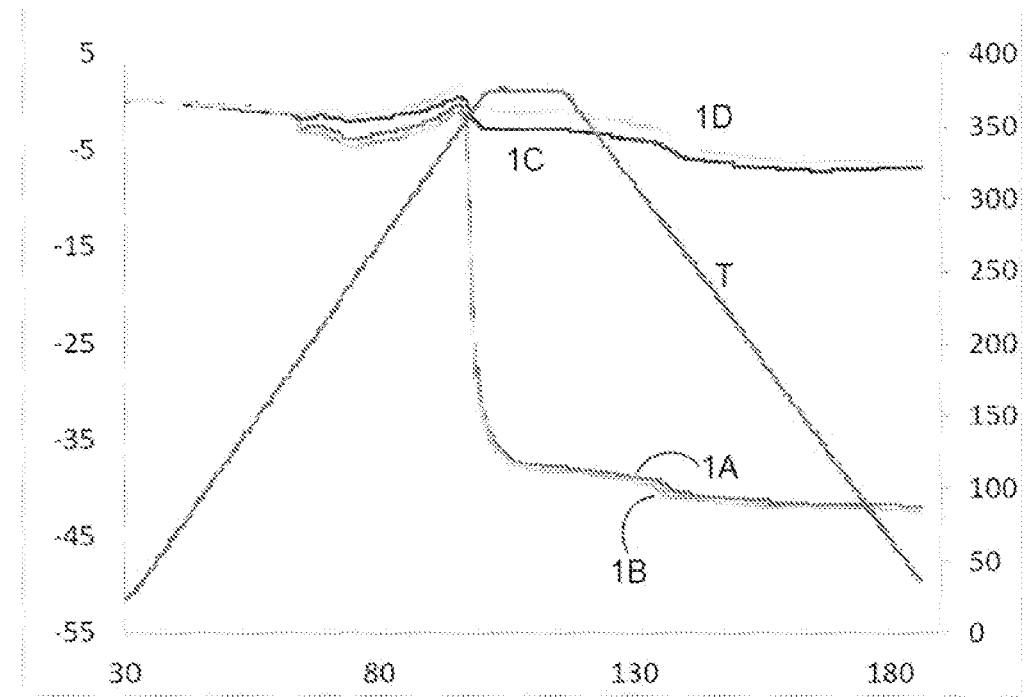
[Fig. 2]
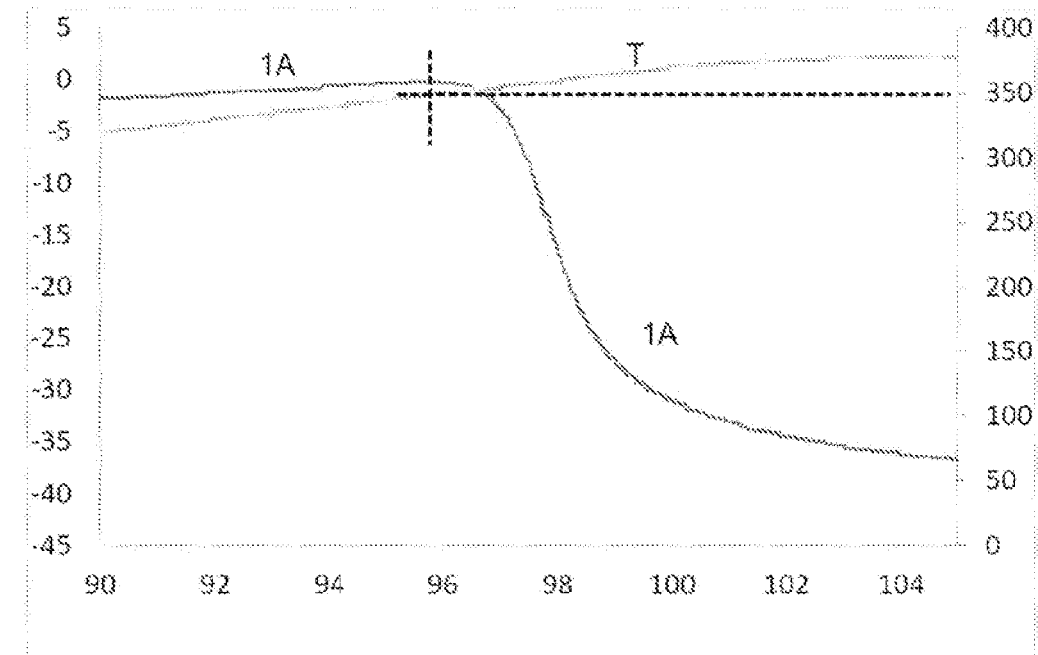

[Fig. 3]
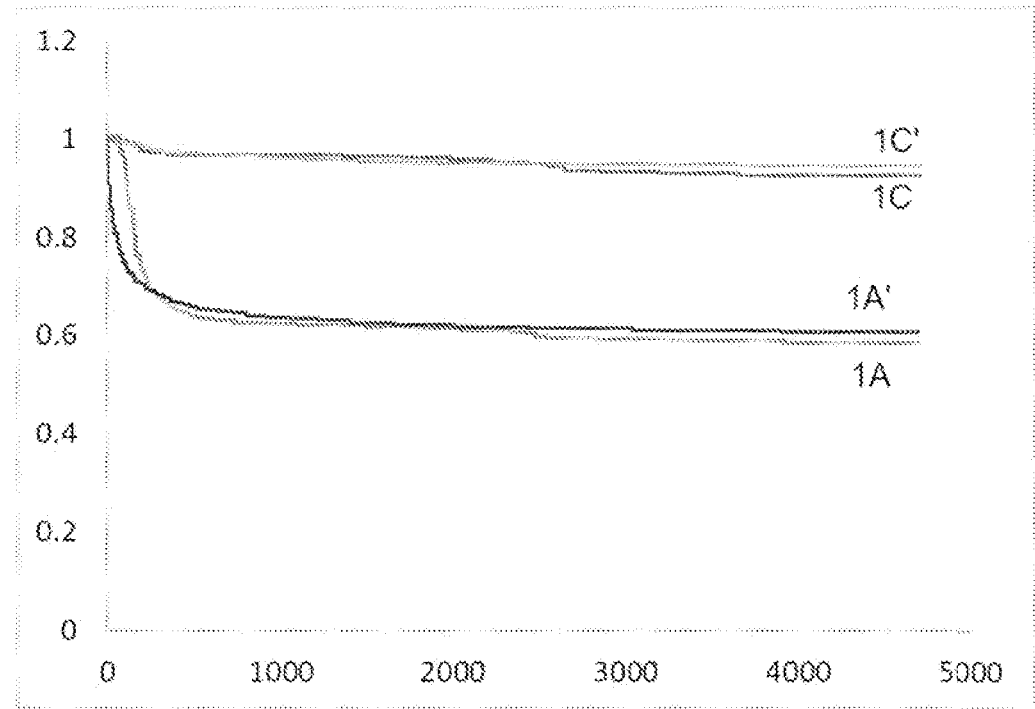
[Fig. 4]
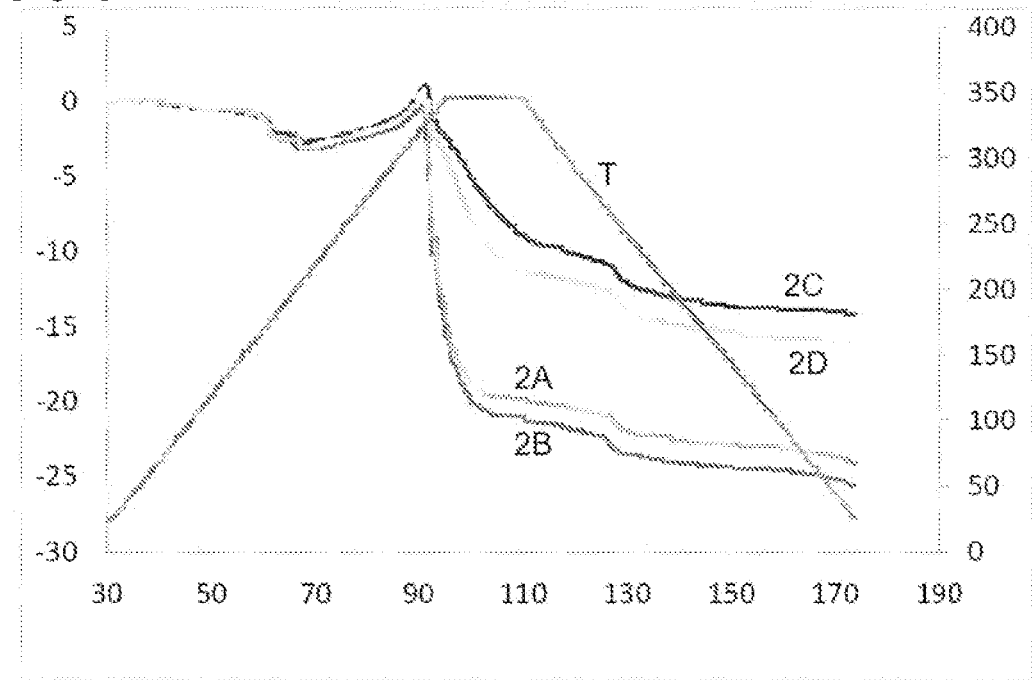

[Fig. 5]
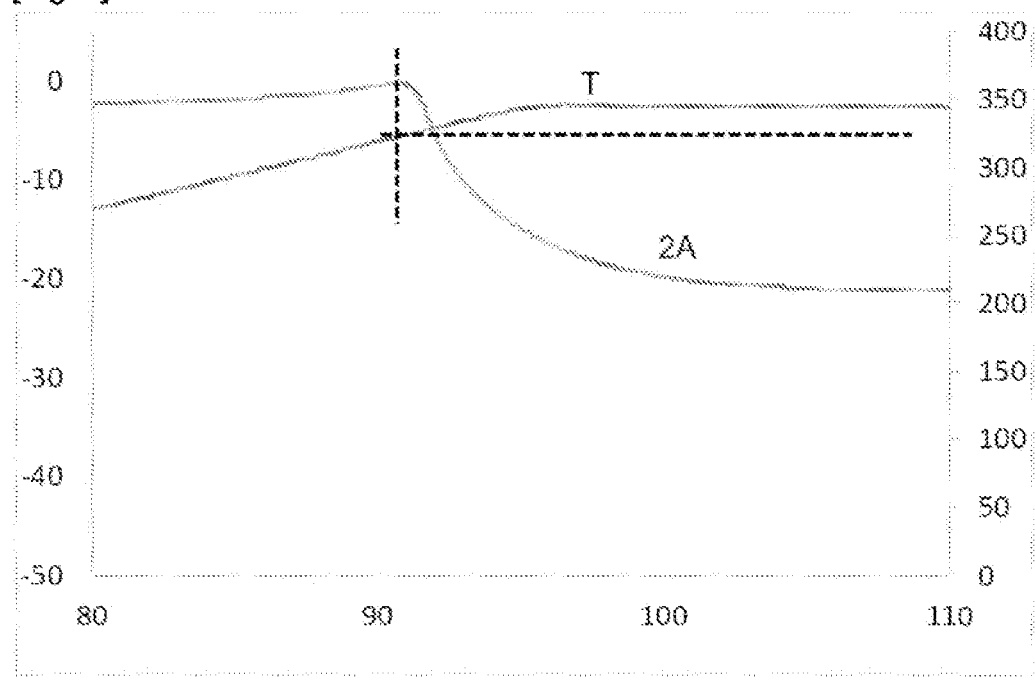
[Fig. 6]
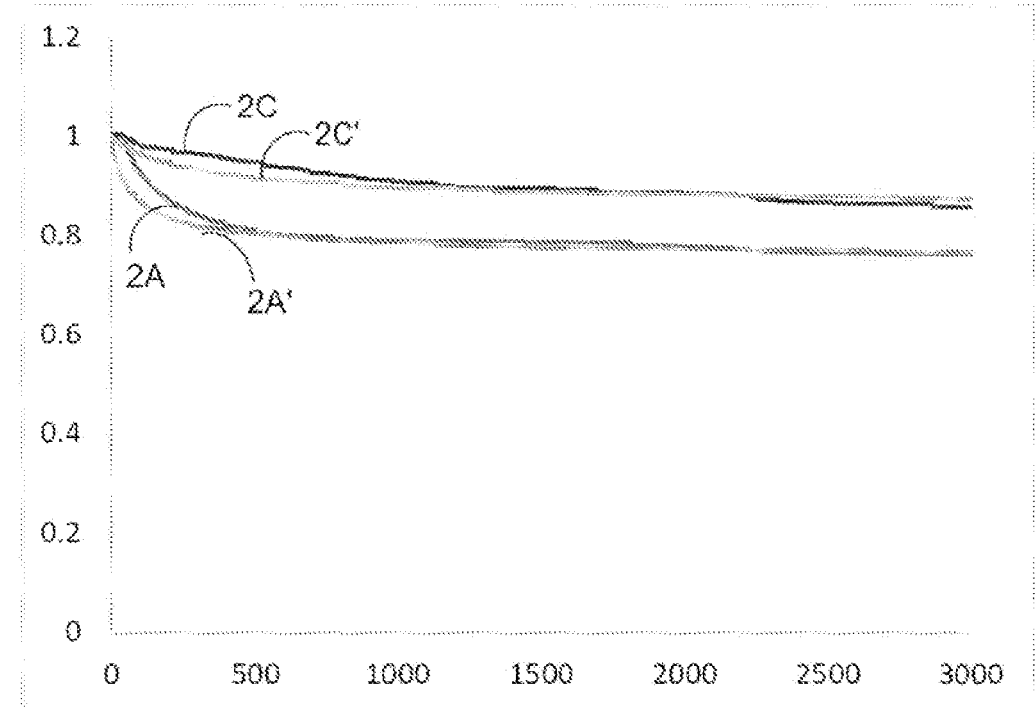

[Fig. 7]
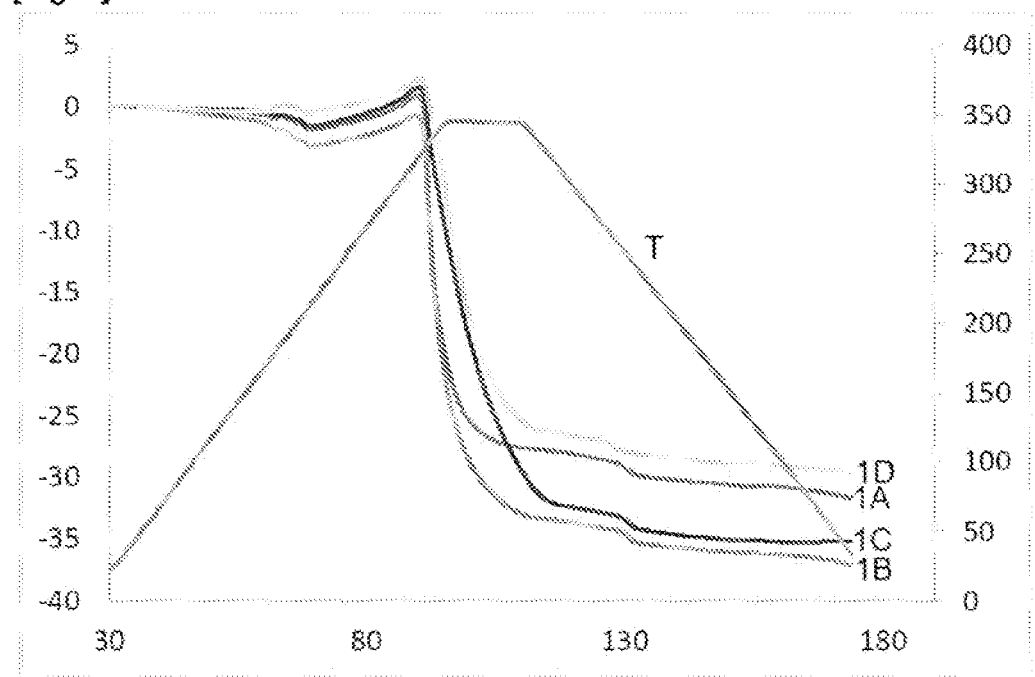
[Fig. 8]
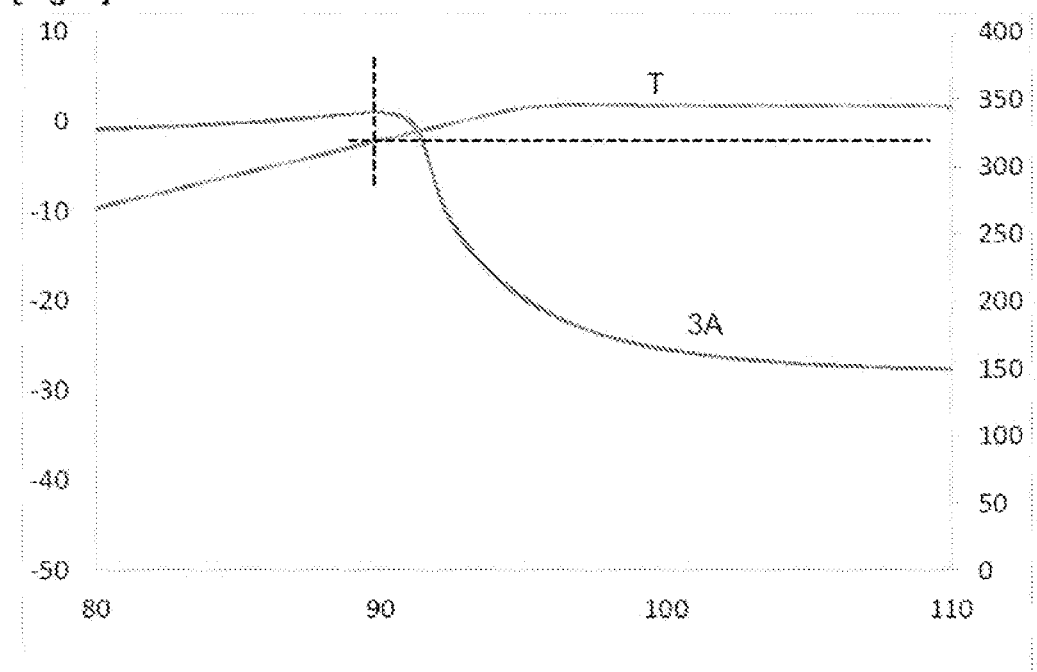

[Fig. 9]
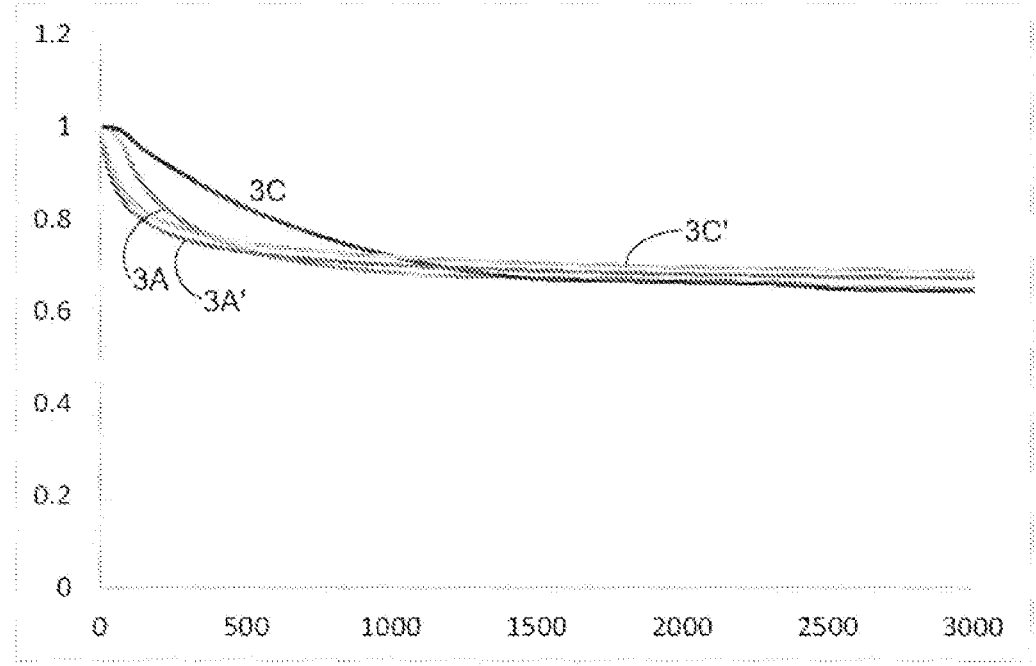
[Fig. 10]
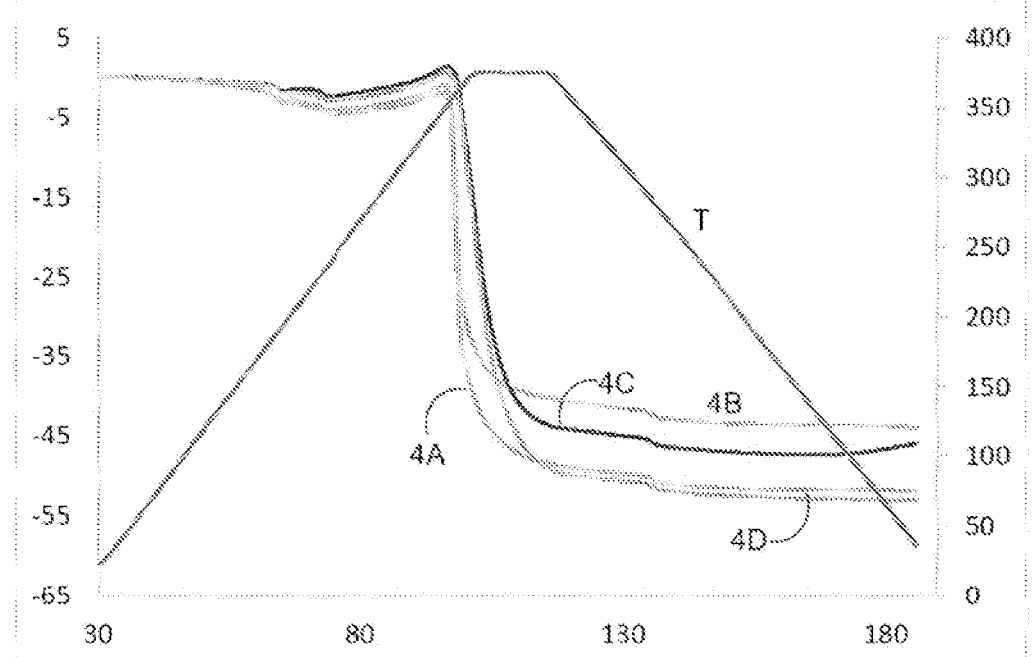

[Fig. 11]
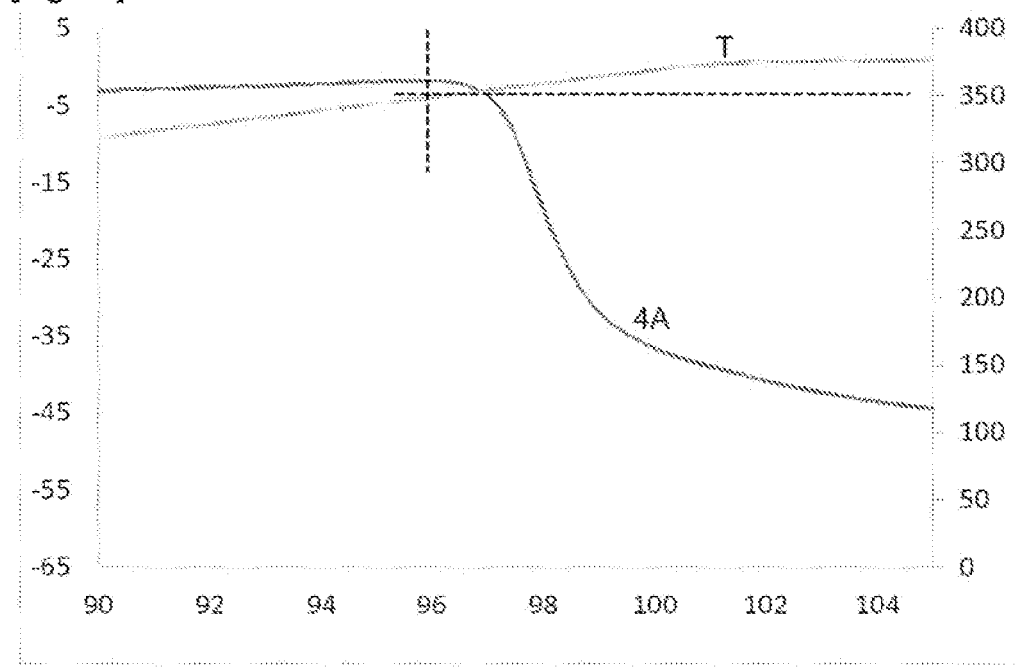
[Fig. 12]
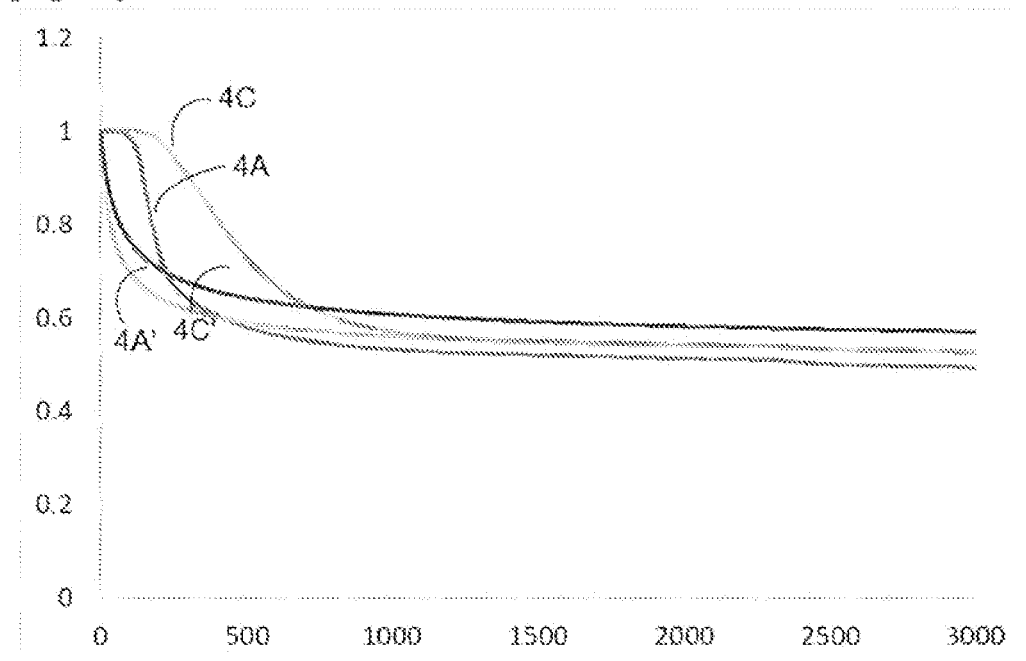

METHOD FOR ANALYSING SEMI-FINISHED PRODUCTS COMPRISING A THERMOPLASTIC RESIN

FIELD OF THE INVENTION

The present invention relates to a method for analyzing semifinished products comprising reinforcing fibers and a thermoplastic resin and to said semifinished products. The present invention also relates to a method for manufacturing a composite part from this semifinished product and to a composite part obtained via the method.

TECHNICAL BACKGROUND

Composite materials combining a thermoplastic resin with reinforcing fibers are, due to their excellent mechanical properties for a low weight, of great interest in numerous fields, notably in the aeronautical and space industry, but also in the motor vehicle industry and the sports equipment industry.

These composite materials are generally manufactured by consolidation of semifinished products consisting of resin-coated reinforcing fibers, such as prepregs in the form of unidirectional sheets, of rovings or of woven fabrics.

These semifinished products can be obtained by impregnating the fibers with the resin. Various processes exist in which the resin can be molten, either dissolved in a solvent, or in powder form, in a fluidized bed, or dispersed in an aqueous solution. The impregnated fibers are subsequently, where appropriate, stripped of the solvent or of the aqueous solution and then heated in order to melt the retained resin and to form the semifinished product.

Composites are obtained from semifinished products by stacking the semifinished products as a thermoplastic preform and subsequent densification of this preform.

The densification of the preform can be carried out for example in an autoclave. A composite part obtained by autoclave consolidation has a very good level of densification, characterized by a degree of porosity of 1% to 2%. It is the pressure applied by the autoclave (up to more than 10 bar) which, coupled with the thermal cycle, enables the semifinished products to flow-fill the porosities present in the preform. Flowing into the semifinished products in order to densify the thermoplastic preform thus constitutes a key factor in the consolidation of a composite part.

These days, the industrial world, in particular the aeronautics sector, seeks to dispense with autoclaves. This is because these pieces of equipment are extremely energy-consuming and complicate the manufacture of large-sized parts. Therefore, the industry is turning to the "out of autoclave" consolidation process (vacuum bag only, out of autoclave). This process enables allows consolidation under a lower pressure, applied to the preform by means of a simple vacuum bag, i.e. a membrane under which a vacuum is applied to press the bag against the preform to be consolidated with a pressure of the order of one bar. The thermal cycle enabling the consolidation can be carried out in a simple oven. However, this method requires a good flow capacity of the semifinished product under low pressure in order to achieve satisfactory densification in the composite part.

Documents US 2014/0154472, US 2010/0170637, US 2014/0005331, US 2013/0164498 and US 2011/0097575 relate to the manufacture of composite materials having improved adhesive and/or mechanical properties owing to the presence of a layer of resin between the various layers of semifinished products.

Document US 2012/0107560 relates to the manufacture of composite materials from semifinished products having particles on their surface which allow improvement of the mechanical properties of the composite materials manufactured.

WO 2019/097148 A1 describes a process for manufacturing semifinished products by impregnating fibers in an aqueous dispersion of PAEK powder.

Document EP 2 090 423 A1 describes a semifinished product comprising reinforcing fibers having an essentially unidirectional orientation and a thermoplastic resin.

There is still a need to provide a semifinished product which can be consolidated effectively, in order to prepare high-quality composite materials.

There is also a need to provide a method for analyzing semifinished products in order to determine those that can be consolidated effectively in order to prepare high-quality composite materials.

SUMMARY OF THE INVENTION

The invention relates firstly to a method for analyzing semifinished products comprising reinforcing fibers having an essentially unidirectional orientation and a thermoplastic resin, the method comprising:
  a first test comprising:
    preparing a stack of at least two identical semifinished products, the fibers of the adjacent semifinished products having a difference in orientation of 0°;
    heating the stack to a temperature above the melting temperature of the resin;
    cooling the stack to a temperature below the crystallization temperature;
    the stack being compressed in a direction of compression orthogonal to the orientation of the fibers of all the semifinished products during the heating and cooling;
    measuring the thickness of the stack in the direction of compression over time,
    determining the equivalent homogeneous viscosity of the stack from the measurement of the thickness of the stack over time, and
  a second test comprising:
    preparing a stack of at least two identical semifinished products, the fibers of the adjacent semifinished products having a difference in orientation of 90° in absolute value;
    heating the stack to a temperature above the melting temperature of the resin;
    cooling the stack to a temperature below the crystallization temperature;
    the stack being compressed in a direction of compression orthogonal to the orientation of the fibers of all the semifinished products during the heating and cooling;
    measuring the thickness of the stack in the direction of compression over time;
    determining the equivalent homogeneous viscosity of the stack from the measurement of the thickness of the stack over time;
  the method further comprising:
    determining a first parameter corresponding to the total thickness reduction of the stack of semifinished products during the first test;

determining a second parameter corresponding to the ratio of the equivalent homogeneous viscosity of the stack of semifinished products from the second test to the equivalent homogeneous viscosity of the stack of semifinished products from the first test;

determining a third parameter corresponding to the ratio of the thickness of the stack of semifinished products from the first test after a reference time starting from the moment, during the heating step, of the onset of melting of the stack of semifinished products, to the thickness of the stack of semifinished products from the first test at the moment, during the heating step, of the onset of melting of the stack of semifinished products.

According to certain embodiments, the compression in the first test and the second test is at a pressure of 0.5 to 2 bar, preferably 0.8 bar to 1.2 bar, preferably 0.8 bar.

According to certain embodiments, the reference time for the determination of the third parameter is from 1 to 5000 s, preferably from 60 to 1000 s, and preferably is 500 s.

According to certain embodiments, the method comprises a step of validating the stack of semifinished products if the first parameter, the second parameter and the third parameter have values within respective target ranges.

According to certain embodiments:
the target range of the first parameter is at least 15%; and/or
the target range of the second parameter is from 1 to 5; and/or
the target range of the third parameter is less than 0.8.

According to certain embodiments, the method comprises a step of validating the stack of semifinished products if the first parameter, the second parameter and the third parameter have values within respective target ranges, and wherein the compression in the first test and the second test is at a pressure of 0.8 bar, the reference time for determining the third parameter is 500 s, the target range of the first parameter is at least 15%, the target range of the second parameter is from 1 to 5 and the target range of the third parameter is less than 0.8.

The invention also relates to a semifinished product comprising reinforcing fibers having an essentially unidirectional orientation and a thermoplastic resin, the semifinished product satisfying the validation of the analysis method as above.

According to certain embodiments, the thermoplastic resin is chosen from the group of polyamides, polyimides, in particular polyetherimides, polyaryletherketones, in particular polyetherketones, polyetherketoneketones and polyetheretherketones, polyethylene terephthalate, polyolefins, in particular polypropylene, polyphenylene sulfide, polysulfones, halogenated polymers, in particular polyvinyl chloride and polyvinylidene fluoride, acrylic or methacrylic polymers, and is preferably a polyaryletherketone such as polyetherketone, polyetherketoneketone, polyetheretherketone, or one of the copolymers thereof, in particular copolymers comprising etheretherketone and etherdiphenyletherketone units.

According to certain embodiments, the reinforcing fibers are carbon fibers and/or glass fibers.

According to certain embodiments, the thermoplastic resin has a melting temperature of from 250° C. to 400° C., preferably from 280° C. to 380° C., and more preferably from 300° C. to 350° C.

The invention also relates to a method for manufacturing a composite part from at least two semifinished products as described above, the method comprising the following steps:

supplying the semifinished products;
stacking the semifinished products;
heating the semifinished products under pressure to a temperature above the melting temperature of the resin, in order to bring about the melting of the resin and the consolidation of the semifinished products; and
cooling the semifinished products in order to obtain the composite part.

According to certain embodiments, during the stacking of the semifinished products, the fibers of the adjacent semifinished products have a difference in orientation of from 0 to 90°, in absolute value.

According to certain embodiments, the semifinished products are consolidated out-of-autoclave.

The invention also relates to the use of a semifinished product as described above, for the manufacture of composite parts by out-of-autoclave consolidation.

The invention also relates to a composite part obtained by the above method.

According to certain embodiments, the composite part comprises from 2 to 150, preferably from 4 to 40, more preferably from 6 to 30, and ideally from 7 to 25 plies, each ply comprising at least two semifinished products arranged adjacently.

According to certain embodiments, the composite part is a part of an air or space locomotion craft, or a part of a drilling unit, or a part intended to be positioned in contact with or close to a vehicle engine or a reactor, or a part intended to be subjected to friction.

The present invention makes it possible to meet the need expressed in the prior art. More particularly, it provides a method for analyzing semifinished products in order to determine those that can be consolidated effectively in order to prepare high-quality composite materials. It also relates to semifinished products having been validated by this method.

It has been discovered by the present inventors that the manufacture of high-quality composite materials is highly dependent on the flow properties of the semifinished products as they are consolidated. Obtaining a semifinished product with good flow properties enables optimal consolidation, and therefore the manufacture of composite parts with few defects.

The analysis method presented above makes it possible to distinguish the semifinished products that have good flow properties from those that do not have good flow properties.

BRIEF DESCRIPTION OF THE FIGURES

FIG. 1 represents the deformation (or variation in thickness) of a first stack of semifinished products (left y-axis, %) and the temperature (right y-axis, ° C.), as a function of time (x-axis, min).

FIG. 2 represents an enlargement of FIG. 1.

FIG. 3 represents the $H(t)/H_0$ ratio (y-axis) as a function of time (x-axis, s) for the first stack of semifinished products, $H(t)$ representing the thickness and $H_0$ representing the thickness at the onset of melting.

FIG. 4 represents the deformation (or variation in thickness) of a second stack of semifinished products (left y-axis, %) and the temperature (right y-axis, ° C.), as a function of time (x-axis, min).

FIG. 5 represents an enlargement of FIG. 4.

FIG. 6 represents the $H(t)/H_0$ ratio (y-axis) as a function of time (x-axis, s) for the second stack of semifinished products, $H(t)$ representing the thickness and $H_0$ representing the thickness at the onset of melting.

FIG. 7 represents the deformation (or variation in thickness) of a third stack of semifinished products (left y-axis, %) and the temperature (right y-axis, ° C.), as a function of time (x-axis, min).

FIG. 8 represents an enlargement of FIG. 7.

FIG. 9 represents the H(t)/H$_0$ ratio (y-axis) as a function of time (x-axis, s) for the third stack of semifinished products, H(t) representing the thickness and H$_0$ representing the thickness at the onset of melting.

FIG. 10 represents the deformation (or variation in thickness) of a fourth stack of semifinished products (left y-axis, %) and the temperature (right y-axis, ° C.), as a function of time (x-axis, min).

FIG. 11 represents an enlargement of FIG. 10.

FIG. 12 represents the H(t)/H$_0$ ratio (y-axis) as a function of time (x-axis, s) for the fourth stack of semifinished products, H(t) representing the thickness and H$_0$ representing the thickness at the onset of melting.

DETAILED DESCRIPTION

Figure 13:
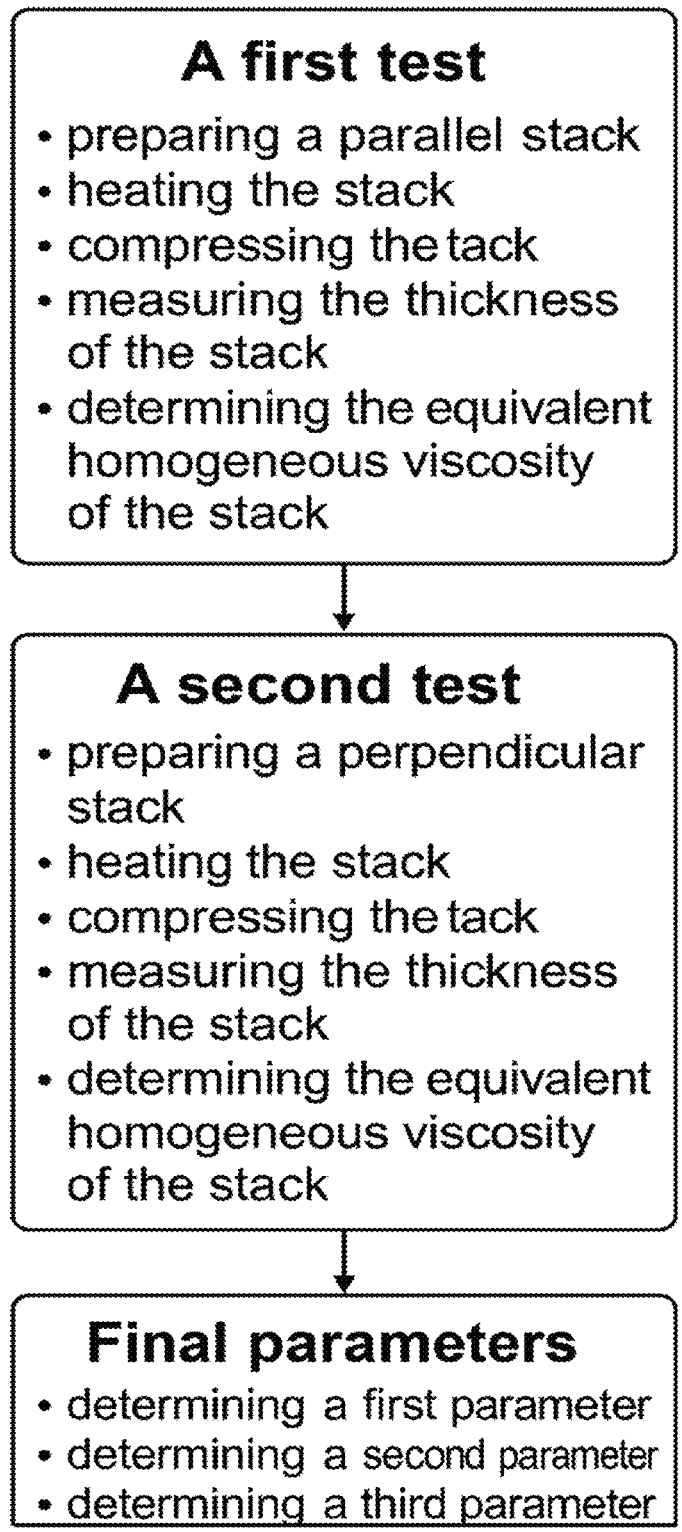

The invention is now described in greater detail and in a nonlimiting manner in the description that follows.

Semifinished Products

The term "semifinished product" means a product comprising a resin and reinforcing fibers, which is used as an intermediate product in the manufacture of composite materials. The semifinished products according to the invention are prepregs (or tapes) in the form of a sheet of fibers in a resin matrix. The reinforcing fibers have an essentially unidirectional orientation in the semifinished product. This orientation is due to the process for manufacturing semifinished products which comprises a step of unwinding reels of reinforcing fibers arranged adjacent to one another.

The resin of the semifinished product is a thermoplastic resin which may comprise one or more thermoplastic materials.

Examples of suitable thermoplastic materials for the invention are polyamides, polysulfones, polyphenylene sulfide (PPS), polyimides, in particular polyetherimides (PEI), polyaryletherketones (PAEK), in particular polyetherketones (PEK), polyetherketoneketones (PEKK) and polyetheretherketones (PEEK), polyetheretherketoneketones (PEEKK), polyetherketoneetherketoneketones (PEKEKK), polyetheretherketoneetherketones (PE EKEK), polyetheretheretherketones (PEEEK), polyetherdiphenyletherketones (PEDEK), polyethylene terephthalate, and the copolymers thereof such as those comprising etheretherketone and etherdiphenyletherketone units (LMPAEK, PEEK-PEDEK), polyolefins such as polypropylene, halogenated polymers such as polyvinyl chloride (PVC) and polyvinylidene fluoride (PVDF), acrylic or methacrylic polymers. The thermoplastic material can be an amorphous, crystalline or semicrystalline thermoplastic material.

The polyamides may notably be a polyphthalamide (PPA), PA 11, PA 12, PA 6, PA 10/10, PA 6.6, PA 4.6 or a copolyamide.

Advantageously, the thermoplastic resin comprises PPS, PEI or a PAEK such as PEK, PEEK or PEKK as the thermoplastic material. PEKK is particularly preferred.

In certain embodiments, the thermoplastic resin may have a melting temperature Tm of from 250° C. to 400° C., preferably from 280° C. to 380° C., and more preferably from 300° C. to 350° C. The melting temperature is measured by differential scanning calorimetry (DSC) according to standard ISO 11357-3.

In certain embodiments, the thermoplastic resin may have a crystallization temperature Tc of from 150° C. to 400° C., preferably from 200° C. to 250° C., and more preferably from 210° C. to 250° C. The melting temperature is measured by differential scanning calorimetry (DSC) according to standard ISO 11357-3.

The reinforcing fibers used for manufacturing the semifinished products may be chosen from any fiber which is able to be used as reinforcement in the manufacture of parts made of composite materials.

Thus, they may notably be glass fibers, quartz fibers, carbon fibers, graphite fibers, silica fibers, metal fibers, such as steel fibers, aluminum fibers or boron fibers, ceramic fibers, such as silicon carbide or boron carbide fibers, synthetic organic fibers, such as aramid fibers or poly(p-phenylene benzobisoxazole) fibers, better known under the acronym PBO, or else PAEK fibers, or else mixtures of such fibers.

Preferably, they are carbon fibers or glass fibers, and more particularly carbon fibers.

The fibers are preferably nonsized. When they are sized, the size is preferably suitable for the resin, notably in that it does not produce degradation products detrimental to the resin.

Any fiber diameter may be suitable. The mean diameter of the reinforcing fibers may notably be from 2 to 20 μm, preferably from 4 to 15 μm, more preferably from 6 to 10 μm.

In the semifinished product, all the fibers can have a surface density of from 50 to 1000 g/m$^2$, preferably from 80 to 500 g/m$^2$, and more preferably from 100 to 300 g/m$^2$. The surface density of the fibers is measured according to the standard ASTM D3776/D3766 M-09(a)2017 option C.

The reinforcing fibers used are preferably continuous in the semifinished product, that is to say they extend essentially over the entire length of the semifinished product.

Specifically, the semifinished products according to the invention can be manufactured by unwinding, in an aligned manner, rovings of fibers initially wound on reels, arranged adjacent to one another, and by placing said rovings under tension; then by carrying out an impregnation with the resin. And finally, after impregnation, winding of the semifinished product is carried out.

The number of rovings arranged adjacently may notably be from 1 to 300, preferably from 20 to 200, more preferably from 30 to 100, for example around 50. Each roving may comprise in particular from 1000 to 50 000 fibers, preferably from 2000 to 30 000 fibers, more preferably from 5000 to 20 000 fibers, more preferably from 10 000 to 15 000 fibers, for example around 12 000 fibers.

The impregnation can be carried out by introducing and circulating the reinforcing fibers in a bath of aqueous dispersion of resin. The fibers impregnated with thermoplastic resin powder are subsequently removed from the bath and stripped of the water, for example by drying in an infrared oven. The dried impregnated fibers are subsequently heated until the thermoplastic resin has melted, so as to allow the coating of the fibers with the resin. The coated fibers obtained are subsequently, where appropriate, formed, for example by calendering. This step may make it possible to texture and ensure the proportioning of the semifinished product.

Alternatively, the impregnation can be carried out by introducing and circulating the reinforcing fibers in a bath of resin dissolved in a solvent, then by drying, heating and calendering as described above.

Alternatively, the impregnation can be carried out by placing the reinforcing fibers in a fluidized bed of resin powder, then by heating and calendering as described above.

Preferably, the semifinished products according to the invention include from 30% to 90% by weight, preferably from 40% to 80%, in particular from 50% to 80% by weight and in particular from 60% to 70% by weight of reinforcing fibers.

Preferably, the semifinished products according to the invention comprise from 10% to 70% by weight, preferably from 20% to 60%, in particular from 20% to 50% by weight, and in particular from 30% to 40% by weight of resin. This content is measured according to the ASTM D3529 standard.

The semifinished products of the invention may also additionally comprise fillers (other than the reinforcing fibers) and/or functional additives. Among the functional additives, it is possible in particular to include one or more surfactants, UV stabilizers, heat stabilizers, impact modifiers, blowing agents and/or biocidal agents.

The fillers may in particular be mineral fillers, such as alumina, silica, calcium carbonate, titanium dioxide, glass beads, carbon black, graphite, graphene and carbon nanotubes.

The total amount of fillers and additives is preferably less than or equal to 5% by weight, more preferably to 2% by weight, more preferably to 1% by weight in the semifinished product.

The additives and/or fillers, when they are present, can preferably be incorporated during the impregnation with the resin.

Produced in this way, the semifinished product can preferably be in the form of a reel, a tape or a thin sheet. The usual thickness of the semifinished product may be between 20 and 1500 μm, preferably between 80 and 500 μm, and more preferably between 150 and 300 μm, limits included. The width of the semifinished product may vary, but as a general rule it is between 0.5 and 50 cm. The semifinished product can then be unwound and cut to the desired length. This length depends on the size of the composite part in question. Arranged adjacently, the tapes or sheets of semifinished product form plies. The adjacent layup of the semifinished products is carried out to obtain a desired ply width. This width depends on the size of the composite part in question.

Method for Analyzing Semifinished Products

Figure 15:
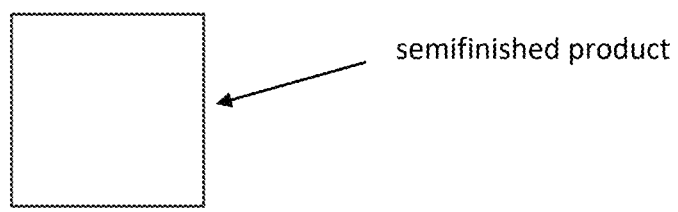

The method for analyzing semifinished products (see FIG. 13 and FIG. 15) makes it possible to distinguish the semifinished products having good flow properties from those which do not have good flow properties.

In order to obtain semifinished products having good flow properties, it is desirable for the fibers in the semifinished product to have a tension uniformity which allows good consolidation of the semifinished product. Indeed, a difference in tension between the fibers of the semifinished product can cause a difference in relaxation of the fibers during the melting of the resin of the semifinished product. This difference in relaxation can hinder the flow of the semifinished product and therefore the consolidation thereof.

It is also desirable for the semifinished product to comprise no, or as few as possible, tangled fibers on its surface, that is to say fibers oriented in a secant manner, for example perpendicular, relative to the main direction of the fibers, since these fibers can reduce the mobility of the semifinished products in the molten state, thereby reducing the ability of the semifinished products to flow.

It is also desirable for the semifinished products to have a certain surface roughness in order to optimize the interpenetration of the semifinished products with each other.

It is also desirable to minimize the fiber breakages likely to occur by friction during the manufacture of the semifinished product.

The implementation of the analysis method of the invention makes it possible to adjust the manufacturing parameters of the semifinished products in order to improve the properties thereof.

Thus, this analysis method comprises a first test and a second test. Each test is carried out by preparing a stack of at least two, for example from two to twenty, or from three to fifteen, or from four to ten, or from five to eight, identical semifinished products. Preferably, each test is carried out with a stack of six semifinished products.

In general, the stack of semifinished products (for both tests) is placed in a test apparatus so that it can be heated and compressed. The test apparatus comprises two compression platens (for exerting a given pressure on the stack, and the displacement of which can be measured) and a temperature control system. In order to carry out a certain compression on the surface of the stack, a force can be applied, this force being chosen simply to respect the relationship $F=\sigma \times S$, with F (in N) the applied force, S (in mm$^2$) the surface area of the stack of semifinished products and $\sigma$ (in MPa) the desired pressure on the stack.

The first test initially comprises the preparation of a stack of at least two identical semifinished products, the fibers of adjacent semifinished products having a difference in orientation of 0°.

The second test itself comprises the preparation of a stack of at least two identical semifinished products, the fibers of adjacent semifinished products having a difference in orientation of 90° approximately in absolute value.

The semifinished products being in the form of thin sheet, these sheets are stacked flat surface against flat surface. Preferably, the flat surfaces have circular or square circumferences, and they are aligned in the stack.

The following steps are identical for the first and the second test.

The stack of semifinished products (from the first test or from the second test) is preferably compressed in a compression direction orthogonal to the platens of the apparatus, i.e. orthogonal to the flat surface of the semifinished products (and therefore to the orientation of the fibers of the semifinished products) in the apparatus above (pre-compaction step). This step can be carried out at room temperature, that is to say at a temperature of from 15° C. to 30° C., and preferably at a temperature of from 18° C. to 25° C., more preferably at a temperature of 23° C. for a period of from 10 to 60 minutes and preferably for a period of around 30 minutes.

Preferably, the pre-compaction step is carried out at a pressure of 0.5 to 2 bar, preferably 0.7 to 1 bar, and more preferably at 0.8 bar.

The stack of semifinished products (from the first test or from the second test) is then heated to a temperature above the melting temperature of the resin and then cooled to a temperature below the melting temperature of the resin, while compressing the stack (as detailed above).

More specifically, during the step of heating the stack of semifinished products, the temperature increases up to a maximum temperature (Tmax), above the melting temperature of the resin, then remains constant for a certain period.

The temperature may preferably increase to the maximum temperature at a constant rate.

Thus, the temperature increases to the maximum temperature preferably at a rate of 1° C. to 10° C. per minute, and preferably from 2° C. to 8° C. per minute, and for example of 5° C. per minute.

The period during which the temperature increases (from room temperature) in order to reach the maximum temperature may be 45 to 90 minutes, and preferably 50 to 75 minutes. In certain embodiments, the period during which the temperature increases in order to reach the maximum temperature can be from 45 to 50 minutes; or from 50 to 55 minutes; or from 55 to 60 minutes; or from 60 to 65 minutes; or from 65 to 70 minutes; or from 70 to 75 minutes; or from 75 to 80 minutes; or from 80 to 85 minutes; or from 85 to 90 minutes.

The maximum temperature is preferably set at a value which is from 5° C. to 60° C. above the melting temperature of the resin, preferably from 10° C. to 50° C. above the melting temperature of the resin, preferably from 20° C. to 40° C. above the melting temperature of the resin, and for example 35° C. above the melting temperature of the resin.

The maximum temperature may be, depending on the case, from 300° C. to 450° C., preferably from 320° C. to 400° C., and for example 375° C. In certain embodiments, the maximum heating temperature may be from 300° C. to 320° C.; or from 320° C. to 340° C.; or from 340° C. to 360° C.; or from 360° C. to 380° C.; or from 380° C. to 400° C.; or from 400° C. to 420° C.; or from 420° C. to 450° C.

The period during which the temperature remains constant at this maximum temperature is preferably 5 to 30 minutes, more preferably from 10 to 20 minutes, and for example 15 minutes. In certain embodiments, the period during which the temperature remains constant may be from 5 to 10 minutes; or from 10 to 15 minutes; or from 15 to 20 minutes; or from 20 to 25 minutes; or from 25 to 30 minutes.

After the heating step, the temperature is reduced to a temperature below the crystallization temperature of the resin, and preferably down to room temperature.

The temperature may preferably decrease from the maximum temperature at a constant rate.

Thus, the temperature decreases preferably with a rate of 1° C. to 10° C. per minute, more preferably from 2° C. to 8° C. per minute, and for example of 5° C. per minute.

The period during which the temperature decreases can notably be from 50 to 100 minutes, and preferably from 60 to 80 minutes.

The application of pressure during the steps of heating and cooling the stack of semifinished products results in a reduction in the thickness of the stack in the compression direction over time.

Preferably, the compression is maintained throughout the duration of the test at a constant value.

Preferably, the compression is maintained throughout the duration of the test at a pressure of 0.5 to 2 bar, preferably of 0.7 to 1 bar, and more preferably at 0.8 bar.

The first and second test also include the measurement of the thickness of the stack in the compression direction over time. This thickness of the stack in the compression direction over time is denoted by "H(t)".

The first and second test also include a step of determining the equivalent homogeneous viscosity of the stack from the measurement of the thickness of the stack over time H(t). This viscosity is calculated from these measurements using a model based on the corrected Stefan equation, as detailed below.

First, the temperature ($T_{onset}$) of the onset of melting of the stack of semifinished products in the test (during heating) is determined. This temperature is determined as being that at which the parameter H(t) has a local maximum. A local maximum is understood to mean a maximum located in the temperature range of interest, namely in particular the range between the glass transition temperature and 30° C. above the melting temperature (Tm+30° C.). $H_0$ denotes the thickness of the stack at the moment when this temperature $T_{onset}$ is reached during heating.

Next, use is made of Stefan's equation:

$$\left(\frac{H(t)}{H_0}\right)_{Stefan} = \left[1 + \frac{4}{3}\frac{FH_0^2}{\pi R^4}\frac{t}{\eta}\right]^{-1/2} \quad \text{[Math 1]}$$

wherein F is the force of the applied compression, R is the radius of the circular surface of the stack of semifinished products or the radius of the circle inscribed in the square surface area of the stack of semifinished products, $H_0$ is as defined above, and $\eta$ is the equivalent homogeneous viscosity of the stack of semifinished products.

Given that this equation is not suitable for anisotropic materials, a correction must be made in order to take into account the maximum compaction of the stack. For this, a linear transformation of the data is carried out according to the following equation:

$$\left(\frac{H(t)}{H_0}\right)_{corr} = \frac{\left(\frac{H(t)}{H_0}\right)_{Stefan} - 1}{-1} \times \left(\left(\left(\frac{H(t)}{H_0}\right)_{exp}\right)_{T=23°\,C.} - 1\right) + 1 \quad \text{[Math 2]}$$

The factor $((H(t)/H_0)_{exp})_{T=23°\,C.}$ represents the ratio $(H(t)/H_0)_{exp}$ (from the measurement) at room temperature (for example T=23° C.), after the end of the compression of the stack of semifinished products.

Thus, by comparing $(H(t)/H_0)_{corr}$ and $(H(t)/H_0)_{exp}$ and fitting the theoretical curve $(H(t)/H_0)_{corr}$ to the experimental curve $(H(t)/H_0)_{exp}$, the equivalent homogeneous viscosity value $\eta$ of the stack of semifinished products is determined giving the optimal fit. This fit can be given by a conventional optimization loop via the least-squares method.

The analysis method according to the invention further comprises the determination of three different parameters.

The first parameter corresponds to the total thickness reduction of the stack of semifinished products during the first test.

The thickness reduction of the stack of semifinished products is referred to here as "deformation".

Firstly, the deformation of the stack of semifinished products over time ($\epsilon(t)$ is calculated from the thickness measurements, according to the following relationship:

$$\epsilon(t) = \frac{H(t)}{H_{30min}} \times 100 \quad \text{[Math 3]}$$

$H_{30\,min}$, corresponds to the thickness of the stack of semifinished products after the pre-compaction step (i.e. before the step of heating the stack).

The second parameter corresponds to the ratio of the equivalent homogeneous viscosity of the stack of semifinished products from the second test to the equivalent homogeneous viscosity of the stack of semifinished products from the first test. The equivalent homogeneous viscosities of the stack of semifinished products from the first and second tests are calculated as detailed above.

The third parameter which is determined corresponds to the ratio of the thickness of the stack of semifinished products from the first test after a reference time starting from the moment, during the heating step, of the onset of melting of the stack of semifinished products (i.e. after a reference time starting from the temperature $T_{onset}$), to the thickness of the stack of semifinished products from the first test at the moment, during the heating step, of the onset of melting of the stack of semifinished products (i.e. at the temperature $T_{onset}$).

According to certain embodiments, this reference time may be from 1 to 5000 s, preferably from 60 to 1000 s, and more preferably 500 s.

During the implementation of the consolidation test, the following are generally observed:
  before the temperature reaches the melting temperature of the resin, variations in the thickness of the stack; these variations can notably include a relatively rapid drop in thickness if/when the temperature reaches the glass transition temperature of the resin (notably due to solid creep), and also a moderate increase in thickness due to the thermal expansion of the compounds;
  from the moment the temperature reaches the melting temperature of the resin, a rapid drop in thickness;
  then a slower drop in thickness;
  and finally a stabilization of the thickness until it remains essentially constant (and equal to the final thickness).

In addition, the analysis method according to the invention may comprise a step of validating the stack of the semifinished products. This makes it possible to identify semifinished products having good flow properties. More particularly, this validation step makes it possible to determine whether, for a stack of semifinished products, the first parameter, the second parameter and the third parameter (as determined and detailed above) have values within respective target ranges.

For the first parameter, the target range may be at least 15%. In other words, the total thickness reduction of the stack of semifinished products during the first test may be at least 15%. Thus, the total thickness reduction is from 15% to 100%, and preferably from 20% to 80%, or even from 30% to 60%.

For the second parameter, the target range may be from 1 to 5. In other words, the ratio of the equivalent homogeneous viscosity of the stack of semifinished products from the second test to the equivalent homogeneous viscosity of the stack of semifinished products from the first test may be from 1 to 5. Thus this ratio may preferably be from 1.5 to 4.5, more preferably from 2 to 4.

For the third parameter, the target range may be less than 0.8. In other words, the ratio of the thickness of the stack of semifinished products from the first test after the reference time starting from the temperature $T_{onset}$, to the thickness of the stack of semifinished products from the first test at the temperature $T_{onset}$ may be less than 0.8. Thus, the thickness ratio of the stack of semifinished products is less than 0.8, preferably less than 0.7, preferably less than 0.8, more preferably less than 0.6, more preferably less than 0.5, more preferably less than 0.4, more preferably less than 0.3, more preferably less than 0.2, and more preferably less than 0.1.

Thus, the semifinished products having good flow properties exhibit, during the implementation of the analysis method presented above (when the compression in the first test and the second test is at a pressure of 0.8 bar and the reference time for determining the third parameter is 500 s), the following three characteristics:
  a total thickness reduction of the stack of semifinished products during the first test of at least 15%,
  a ratio of the equivalent homogeneous viscosity of the stack of semifinished products from the second test to the equivalent homogeneous viscosity of the stack of semifinished products from the first test of from 1 to 5, and
  a ratio of the thickness of the stack of semifinished products from the first test after the reference time starting from the temperature $T_{onset}$, to the thickness of the stack of semifinished products from the first test at the temperature $T_{onset}$ of less than 0.8.

The total deformation (or thickness reduction) corresponds to the variation between the thickness at the time of compression of the stack, and the final (stabilized) thickness. The first criterion stated above therefore means that the semifinished product has flow properties during melting that give it satisfactory interpenetration with other adjacent semifinished products, the fibers of which can easily be organized relative to one another because they are oriented in the same direction.

The ratio of equivalent homogeneous viscosities represents the attenuation that exists between a stack of semifinished products, the fibers of which are oriented in the same direction and which can then interpenetrate easily and a stack of semifinished products, the fibers of which are not oriented in the same direction and cannot therefore interpenetrate easily. The second criterion stated above therefore characterizes an attenuation of the flow phenomena which is attributed to inter-fiber friction dissipative phenomena.

Lastly, the ratio of the thickness of the stack of semifinished products from the first test after the reference time starting from the temperature $T_{onset}$, to the thickness of the stack of semifinished products from the first test at the temperature $T_{onset}$ represents kinetics linked to the flow of the semifinished product. The third criterion stated above thus characterizes a rate at which the flows take place.

Method for Manufacturing Composite Parts

Figure 14:
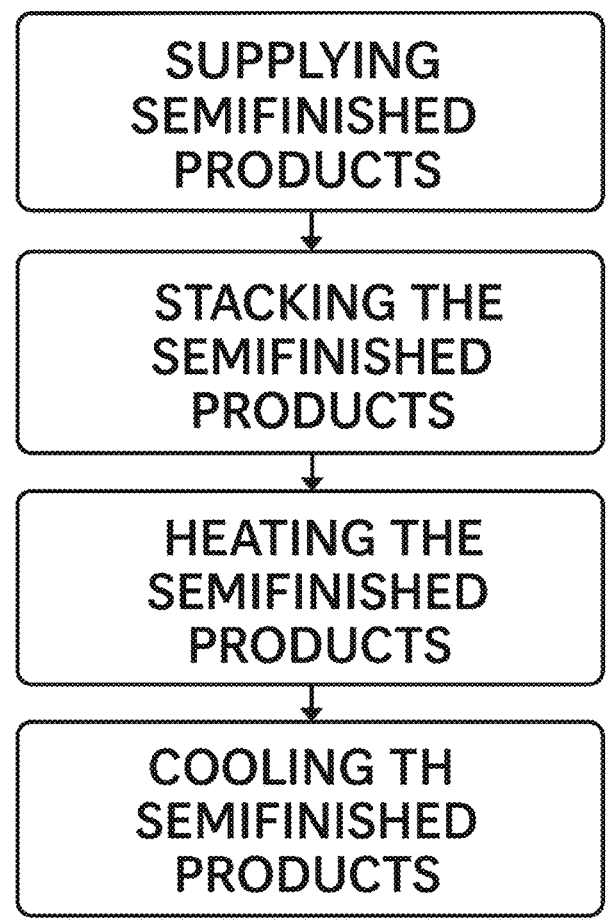
Figure 16:
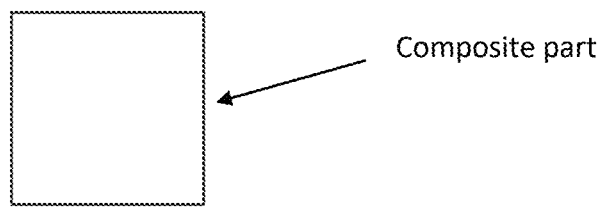

The method according to the invention (see FIG. 14 and FIG. 16) comprises the following steps:
  supplying at least two semifinished products; the semifinished products satisfying the characteristics of the consolidation test described above;
  stacking the semifinished products;
  heating the semifinished products under pressure to a temperature above the melting temperature of the resin, in order to bring about the melting of the resin and the consolidation of the semifinished products; and
  cooling the semifinished products in order to obtain the composite part, preferably also under pressure.

As described above, the semifinished products can be arranged adjacently in order to form plies of a desired width. Thus, the number of plies in a composite part can vary from 2 to 150 plies, preferably from 4 to 40, more preferably from 6 to 30, ideally from 7 to 25. For example, a composite part according to the invention can comprise from 2 to 10; or from 10 to 20; or from to 30; or from 30 to 40; or from 40 to 50; or from 50 to 60; or from 60 to 70; or from 70 to 80; or from 80 to 90; or from 90 to 100; or from 100 to 110; or from 110 to 120; or from 120 to 130; or from 130 to 140; or from 140 to 150 plies.

The reinforcing fibers have an essentially unidirectional orientation in each semifinished product. The unidirectional orientation of the reinforcing fibers can be the same from one semifinished product to the next, i.e. two adjacent semifinished products have unidirectional orientations of the reinforcing fibers which essentially form an angle of 0° relative to one another. Thus, within a ply, the orientation of the reinforcing fibers is essentially unidirectional. Preferably however, the unidirectional orientation of the reinforcing fibers differs from one ply to the next. More preferably, two adjacent plies have unidirectional orientations of reinforcing fibers which essentially form an angle of about 90° relative to one another; or which essentially form an angle of about 45° relative to one another; these angles being given in absolute value.

In certain embodiments, two adjacent plies can have unidirectional orientations of reinforcing fibers which essentially form an angle of from 0 to 20°; or from 20 to 45°; or from 45 to 60°; or from 60 to 90° relative to one another, in absolute value.

The thermoplastic material may be identical or different from one semifinished product to the next of a composite part. Preferably, the thermoplastic material is of the same nature (for example PEK or PEKK or PEEK or PPS) in all of the semifinished products of the composite part. It may optionally comprise a different grade from one semifinished product to the next, for example a different viscosity, a different molecular weight or a different melting temperature. Alternatively, the grade of the thermoplastic material is the same in all the semifinished products of the composite part.

The semifinished products can in particular be stacked, for example by placing or drape forming the semifinished products in a mold.

In certain embodiments, the heating of the semifinished products under pressure can be carried out in an autoclave in order to consolidate the semifinished products by melting.

The pressure applied in the autoclave can be from 5 to 9 bar and preferably from 7 to 8 bar. Thus, the pressure applied in the autoclave can in particular be from 5 to 5.5 bar; or from 5.5 to 6 bar; or from 6 to 6.5 bar; or from 6.5 to 7 bar; or from 7 to 7.5 bar; or from 7.5 to 8 bar; or from 8 to 8.5 bar; or from 8.5 to 9 bar.

In other advantageous embodiments, the semifinished products can be consolidated out-of-autoclave, for example in a vacuum bag placed in an oven. Such equipment is more economical than an autoclave, and is therefore advantageous to use. However, it allows a level of compression which is lower than an autoclave. The semifinished products according to the invention are therefore particularly advantageous because their good flow properties enable them to be consolidated in such economical equipment without adversely affecting the mechanical properties of the composite parts obtained.

The pressure applied in the vacuum bag may be from 50 to 900 mbar and preferably from 100 to 300 mbar. Thus, the pressure applied in the vacuum bag may in particular be from 50 to 100 mbar; or from 100 to 150 mbar; or from 150 to 200 mbar; or from 200 to 250 mbar; or from 250 to 300 mbar; or from 300 to 400 mbar; or from 400 to 600 mbar; or from 600 to 900 mbar. Thus the pressure applied to the stack of semifinished products is the difference between atmospheric pressure and the pressure applied under the vacuum bag.

During the step of heating under pressure, the temperature may increase to a maximum temperature, above the melting temperature of the thermoplastic resin, and then remain constant.

The heating of the semifinished products under pressure is followed by the cooling thereof in order to solidify the composite part. Thus, the temperature is decreased to a temperature below the melting temperature of the resin.

The maximum temperature is preferably set at a value which is from 5° C. to 50° C. above the melting temperature of the resin, preferably from 10° C. to 40° C. above the melting temperature of the resin, preferably from 20° C. at 30° C. above the melting temperature of the resin, and for example 25° C. above the melting temperature of the resin.

The maximum temperature may be, depending on the case, from 300° C. to 450° C., preferably from 350° C. to 400° C., and for example 375° C. In certain embodiments, the maximum heating temperature may be from 300° C. to 320° C.; or from 320° C. to 340° C.; or from 340° C. to 360° C.; or from 360° C. to 380° C., or from 380° C. to 400° C., or from 400° C. to 420° C.; or from 420° C. to 450° C.

In the processes for manufacturing composite parts, the semifinished products may be subjected to various thermal cycles under pressure in order to assemble them together to form the composite part and/or to shape it.

The composite parts thus manufactured may be further converted, in order to obtain assemblies of complex composite parts. Thus, it is possible to co-consolidate composite parts, this process generally being performed in an autoclave by means of a fresh thermal cycle, or to weld parts to one another by local heating.

The composite parts produced can have a thickness of from 0.1 to 40 mm, preferably from 1 to 20 mm, and more preferably from 2 to 10 mm. This thickness is measured according to the ASTM D3171 standard.

The composite parts according to the invention may have a porosity equal to or less than 5%, preferably equal to or less than 4%, more preferably equal to or less than 3%, more preferentially equal to or less than 2%, and even more preferentially equal to or less than 1%. This porosity is measured according to the ISO 2283 standard.

The composite parts which are obtained with the process according to the invention can be parts of air or space locomotion craft, or parts of a drilling unit (for hydrocarbon fields), or any part located in contact with or close to an engine (for example a maritime, land or air vehicle engine) or a reactor, and in particular seals, connectors, sheaths and structural parts. They can also be parts intended to be subjected to friction, that is to say parts in movable contact with one or more surfaces, in use. Such parts can in particular be supports, rings, valve seats, gears, pistons, piston rings, valve guides, compressor blades, seals and components of engines.

EXAMPLES

The following examples illustrate the invention without limiting it.

The analysis method described above was applied to four stacks of different semifinished products (examples 1 to 4).

In the four examples, the semifinished products were 11 mm×11 mm square sheets.

In all cases, six semifinished products were used to form a stack.

The consolidation of the stack was carried out with a dynamic mechanical analysis device (Q800 device from TA).

A compression assembly (consisting of an upper cylindrical platen with a diameter of 12.6 mm and a lower cylindrical platen with a diameter greater than 12.6 mm) was used in order to provide a compaction force of 10 N necessary for the consolidation. Thus, the cross section of the upper compression platen gave a pressure of the order of 0.8 bar. Coupled with this constant creep force, a thermal cycle was applied to the sample using the oven of the dynamic mechanical analysis apparatus:

Isotherm at 23° C. for 30 min (pre-compaction);
Temperature increase from 23° C. to Tmax at 5° C./min. The maximum temperature Tmax is 35° C. higher than the melting temperature Tm of the resin;
Isotherm at Tmax for 15 min;
Cooling from Tmax to 23° C. at 5° C./min.

Under these conditions, a first test was carried out with a stack of six semifinished products, the fibers of adjacent semifinished products having a difference in orientation of 0° (same orientation). The thickness of the stack H over time (H(t)) and also the temperature were recorded. In addition, the equivalent homogeneous viscosity was calculated using the methodology described above.

In addition, under these conditions, a second test was carried out with a stack of six semifinished products, the fibers of adjacent semifinished products having a difference in orientation of 90°. The thickness of the stack H over time (H(t)) and the temperature were also recorded. In addition, the equivalent homogeneous viscosity was calculated using the equations described above.

Example 1

In this first example, the semifinished products comprise a polyetherketoneketone (PEKK) resin and carbon fibers.

These semifinished products are obtained by introducing and circulating reinforcing fibers (HexTow® AS4 sold by HEXCEL) in a bath of aqueous dispersion comprising 4% to 10% of PEKK resin (Kepstan 7002, PT 20 microns sold by ARKEMA France) in powder form and also 2%, relative to the weight of PEKK, of dioctyl sodium sulfosuccinate. The resin-impregnated fibers are subsequently removed from the bath and stripped of the water by drying in an infrared oven. The dried impregnated fibers are subsequently heated until the resin has melted, so as to allow the coating of the fibers with the resin. The coated fibers obtained are then shaped by calendering, in order to produce a semifinished product having a thickness of 150 μm and are cut to a width of 300 mm.

The weight content of resin in the semifinished product is around 34% and the weight per unit area of carbon fibers is around 145 g/m².

The curve of deformation as a function of time of two stacks according to the first test (1A and 1B) and of two stacks according to the second test (1C and 1D) is illustrated in FIG. 1. The curve also illustrates temperature (T) as a function of time. Deformation (%) is illustrated on the (left) y-axis and temperature (° C.) is illustrated on the (right) y-axis. The time (min) is illustrated on the x-axis. This curve illustrates a deformation of each stack from the first test (1A and 1B) of 35% to 45% (which is within the target range of the first parameter).

Next, from the curve of FIG. 1, the temperature $T_{onset}$ is determined at 347° C. from the position of the local maximum of the thickness of the stack. This is best illustrated in FIG. 2 which is an enlargement of FIG. 1.

The experimental curves (1A, 1B) and calculated curves (1A', 10') of the H(t)/H₀ ratio (on the y-axis) as a function of time (on the x-axis) are illustrated in FIG. 3. The calculated curves correspond to the function $(H(t)/H_0)_{corr}$ described above, for which the fit to the experimental curves is the best. This makes it possible to determine the equivalent homogeneous viscosity parameter η.

The H(t)/H₀ ratio of the stack of semifinished products according to the first test at 500 seconds from $T_{onset}$ is 0.64. This value is less than 0.8 which is within the target range of the third parameter.

Finally, the ratio of the equivalent homogeneous viscosity of the stack of semiproducts from the second test to the equivalent homogeneous viscosity of the stack of semiproducts from the first test is 14, which is outside the target range of the second parameter.

Consequently, this semifinished product does not satisfy the three parameters to have good flow properties (since the second parameter is not within the target range).

Example 2

In this second example, the semifinished products comprise a resin of a copolymer comprising etheretherketone and etherdiphenyletherketone units (LM PAEK) and carbon fibers.

These semifinished products are obtained by introducing and circulating reinforcing fibers (HexTow® AS4 sold by HEXCEL) in a bath of aqueous dispersion comprising 5% to 10% of LM PAEK resin (sold by VICTREX) in powder form and also 2% by weight (relative to the weight of LM PAEK) of dioctyl sodium sulfosuccinate. The resin-impregnated fibers are subsequently removed from the bath and stripped of the water by drying in an infrared oven. The dried impregnated fibers are subsequently heated until the resin has melted, so as to allow the coating of the fibers with the resin. The coated fibers obtained are then shaped by calendering, in order to produce a semifinished product having a thickness of 150 μm and are cut to a width of 100 mm.

The weight content of resin in the semifinished product is around 34% and the weight per unit area of carbon fibers is around 145 g/m².

The curve of deformation as a function of time of two stacks according to the first test (2A and 2B) and of two stacks according to the second test (2C and 2D) is illustrated in FIG. 4. The curve also illustrates temperature (T) as a function of time. Deformation (%) is illustrated on the (left) y-axis and temperature (° C.) is illustrated on the (right) y-axis. The time (min) is illustrated on the x-axis. This curve illustrates a deformation of each stack from the first test (2A and 2B) of 20% to 25% (which is within the target range of the first parameter).

Next, from the curve of FIG. 4, the temperature $T_{onset}$ is determined at 323° C. from the position of the local maximum of the thickness of the stack. This is best illustrated in FIG. 5 which is an enlargement of FIG. 4.

The experimental curves (2A, 2C) and calculated curves (2A', 2C') of the H(t)/H₀ ratio (on the y-axis) as a function of time are illustrated in FIG. 6. The calculated curves correspond to the function $(H(t)/H_0)_{corr}$ described above, for which the fit to the experimental curves is the best. This makes it possible to determine the equivalent homogeneous viscosity parameter η.

The H(t)/H₀ ratio of the stack of semifinished products according to the first test at 500 seconds from $T_{onset}$ is 0.81. This value is greater than 0.8, which is outside the target range of the third parameter.

Finally, the ratio of the equivalent homogeneous viscosity of the stack of semiproducts from the second test to the equivalent homogeneous viscosity of the stack of semiproducts from the first test is 5, which is within the target range of the second parameter.

Consequently, this semifinished product does not satisfy the three parameters to have good flow properties (since the third parameter is not within the target range).

Example 3

In this third example, the semifinished products comprise a polyetherketoneketone (PEKK) resin and carbon fibers.

These semifinished products are obtained by introducing and circulating reinforcing fibers (HexTow® ASD4 sold by HEXCEL) in a bath of aqueous dispersion comprising 5% to 10% of PEKK resin (Kepstan 7003, PT 20 microns sold by ARKEMA France) in powder form and also 2% by weight (relative to the weight of PEKK) of dioctyl sodium sulfosuccinate. The resin-impregnated fibers are subsequently removed from the bath and stripped of the water by drying in an infrared oven. The dried impregnated fibers are subsequently heated until the resin has melted, so as to allow the coating of the fibers with the resin. The coated fibers obtained are then shaped by calendering, in order to produce a semifinished product having a thickness of 250 µm and are cut to a width of 300 mm.

The weight content of resin in the semifinished product is around 34% and the weight per unit area of carbon fibers is around 194 g/m².

The curve of deformation as a function of time of two stacks according to the first test (3A and 3B) and of two stacks according to the second test (3C and 3D) is illustrated in FIG. 7. The curve also illustrates temperature (T) as a function of time. Deformation (%) is illustrated on the (left) y-axis and temperature (° C.) is illustrated on the (right) y-axis. The time (min) is illustrated on the x-axis. This curve illustrates a deformation of each stack from the first test (3A and 3B) of 30% to 40% (which is within the target range of the first parameter).

Next, from the curve of FIG. 7, the temperature $T_{onset}$ is determined at 320° C. from the position of the local maximum of the thickness of the stack. This is best illustrated in FIG. 8 which is an enlargement of FIG. 7.

The experimental curves (3A, 3C) and calculated curves (3A', 3C') of the $H(t)/H_0$ ratio (on the y-axis) as a function of time are illustrated in FIG. 9. The calculated curves correspond to the function $(H(t)/H_0)_{corr}$ described above, for which the fit to the experimental curves is the best. This makes it possible to determine the equivalent homogeneous viscosity parameter η.

The $H(t)/H_0$ ratio of the stack of semifinished products according to the first test at 500 seconds from $T_{onset}$ is 0.75. This value is less than 0.8 which is within the target range of the third parameter.

Finally, the ratio of the equivalent homogeneous viscosity of the stack of semiproducts from the second test to the equivalent homogeneous viscosity of the stack of semiproducts from the first test is 2, which is within the target range of the second parameter.

Consequently, this semifinished product satisfies the three parameters to have good flow properties.

Example 4

In this fourth example, the semifinished products comprise a resin of a copolymer comprising etheretherketone and etherdiphenyletherketone units (LM PAEK) and carbon fibers. These semifinished products are obtained by introducing and circulating reinforcing fibers (T700 sold by TORAY) in a bath of aqueous dispersion comprising 5% to 10% of LM PAEK resin (sold by VICTREX) in powder form and also 2% by weight (relative to the weight of LM PAEK) of dioctyl sodium sulfosuccinate. The resin-impregnated fibers are subsequently removed from the bath and stripped of the water by drying in an infrared oven. The dried impregnated fibers are subsequently heated until the resin has melted, so as to allow the coating of the fibers with the resin. The coated fibers obtained are then shaped by calendering, in order to produce a semifinished product having a thickness of 150 µm and are cut to a width of 150 mm.

The weight content of resin in the semifinished product is around 34% and the weight per unit area of carbon fibers is around 145 g/m².

The curve of deformation as a function of time of two stacks according to the first test (4A and 4B) and of two stacks according to the second test (4C and 4D) is illustrated in FIG. 10. The curve also illustrates temperature (T) as a function of time. Deformation (%) is illustrated on the (left) y-axis and temperature (° C.) is illustrated on the (right) y-axis. The time (min) is illustrated on the x-axis. This curve illustrates a deformation of each stack from the first test (4A and 4B) of 40% to 55% (which is within the target range of the first parameter).

Next, from the curve of FIG. 10, the temperature $T_{onset}$ is determined at 345° C. from the position of the local maximum of the thickness of the stack. This is best illustrated in FIG. 11 which is an enlargement of FIG. 10.

The experimental curves (4A, 4C) and calculated curves (4A', 4C') of the $H(t)/H_0$ ratio (on the y-axis) as a function of time are illustrated in FIG. 12. The calculated curves correspond to the function $(H(t)/H_0)_{corr}$ described above, for which the fit to the experimental curves is the best. This makes it possible to determine the equivalent homogeneous viscosity parameter η.

The $H(t)/H_0$ ratio of the stack of semifinished products according to the first test at 500 seconds from $T_{onset}$ is 0.58. This value is less than 0.8 which is within the target range of the third parameter.

Finally, the ratio of the equivalent homogeneous viscosity of the stack of semiproducts from the second test to the equivalent homogeneous viscosity of the stack of semiproducts from the first test is 2, which is within the target range of the second parameter.

Consequently, this semifinished product satisfies the three parameters to have good flow properties.

Thus, the present invention provides a method for analyzing semifinished products which makes it possible to distinguish the semifinished products having good flow properties from those which do not have good flow properties. This analysis method makes it possible to determine the semifinished products that can be consolidated effectively in order to prepare high-quality composite materials.

The invention claimed is:
1. A method for analyzing semifinished products comprising reinforcing fibers having an essentially unidirectional orientation and a thermoplastic resin, the method comprising:
    a first test comprising:
        preparing a stack of at least two identical semifinished products, the fibers of the adjacent semifinished products having a difference in orientation of 0°;
        heating the stack to a temperature above the melting temperature of the resin;
        cooling the stack to a temperature below the crystallization temperature;

the stack being compressed in a direction of compression orthogonal to the orientation of the fibers of all the semifinished products during the heating and cooling;

measuring the thickness of the stack in the direction of compression over time;

determining the equivalent homogeneous viscosity of the stack from the measurement of the thickness of the stack over time; and a second test comprising:

preparing a stack of at least two identical semifinished products, the fibers of the adjacent semifinished products having a difference in orientation of 90°;

heating the stack to a temperature above the melting temperature of the resin;

cooling the stack to a temperature below the crystallization temperature;

the stack being compressed in a direction of compression orthogonal to the orientation of the fibers of all the semifinished products during the heating and cooling;

measuring the thickness of the stack in the direction of compression over time; and determining the equivalent homogeneous viscosity of the stack from the measurement of the thickness of the stack over time;

the method further comprising:

determining a first parameter corresponding to the total thickness reduction of the stack of semifinished products during the first test;

determining a second parameter corresponding to the ratio of the equivalent homogeneous viscosity of the stack of semifinished products from the second test to the equivalent homogeneous viscosity of the stack of semifinished products from the first test; and determining a third parameter corresponding to the ratio of the thickness H(t) of the stack of semifinished products from the first test after a reference time starting from the moment, during the heating step, of the onset of melting of the stack of semifinished products, to the thickness $H_0$ at $T_{onset}$ of the stack of semifinished products from the first test at the moment, during the heating step, of the onset of melting of the stack of semifinished products.

2. The method as claimed in claim 1, wherein the compression in the first test and the second test is at a pressure of 0.5 to 2 bar.

3. The method as claimed in claim 1, wherein the reference time for the determination of the third parameter is from 1 to 5000 s.

4. The method as claimed in claim 1, comprising a step of validating the stack of semifinished products if the first parameter, the second parameter and the third parameter have values within respective target ranges.

5. The method as claimed in claim 4, wherein:

the target range of the first parameter is at least 15% of a thickness reduction; and/or the target range of the second parameter is from 1 to 5; and/or the target range of the third parameter is less than 0.8.

6. The method as claimed in claim 1, comprising a step of validating the stack of semifinished products if the first parameter, the second parameter and the third parameter have values within respective target ranges, and wherein the compression in the first test and the second test is at a pressure of 0.8 bar, the reference time for determining the third parameter is 500 s, the target range of the first parameter is at least 15% of a thickness reduction, the target range of the second parameter is from 1 to 5, and the target range of the third parameter is less than 0.8.

7. A semifinished product comprising reinforcing fibers having an essentially unidirectional orientation and a thermoplastic resin, the semifinished product satisfying the validation of the analysis method as claimed in claim 6.

8. The semifinished product as claimed in claim 7, wherein the thermoplastic resin is chosen from the group of polyamides, polyimides, polyaryletherketones, polyethylene terephthalate, polyolefins, polyphenylene sulfide, polysulfones, halogenated polymers, and acrylic or methacrylic polymers.

9. The semifinished product as claimed in claim 7, wherein the reinforcing fibers are carbon fibers and/or glass fibers.

10. The semifinished product as claimed in claim 7, wherein the thermoplastic resin has a melting temperature of from 250° C. to 400° C.

11. A method for manufacturing a composite part from at least two semifinished products as claimed in claim 7, the method comprising the following steps:

supplying the semifinished products;

stacking the semifinished products;

heating the semifinished products under pressure to a temperature above the melting temperature of the resin, in order to bring about the melting of the resin and the consolidation of the semifinished products; and cooling the semifinished products in order to obtain the composite part.

12. The method as claimed in claim 11, wherein, during the stacking of the semifinished products:

the fibers of the adjacent semifinished products have a difference in orientation of from 0 to 90°, in absolute value.

13. The method as claimed in claim 11, wherein the semifinished products are consolidated out-of-autoclave.

14. A composite part obtained by the method as claimed in claim 11.

15. The composite part as claimed in claim 14, comprising from 2 to 150 plies, each ply comprising at least two semifinished products arranged adjacently.

16. The composite part as claimed in claim 14, which is a part of an air or space locomotion craft, or a part of a drilling unit, or a part intended to be positioned in contact with or close to a vehicle engine or a reactor, or a part intended to be subjected to friction.

17. A method comprising using a semifinished product as claimed in claim 7, for the manufacture of composite parts by out-of-autoclave consolidation.

* * * * *